Figure 1:
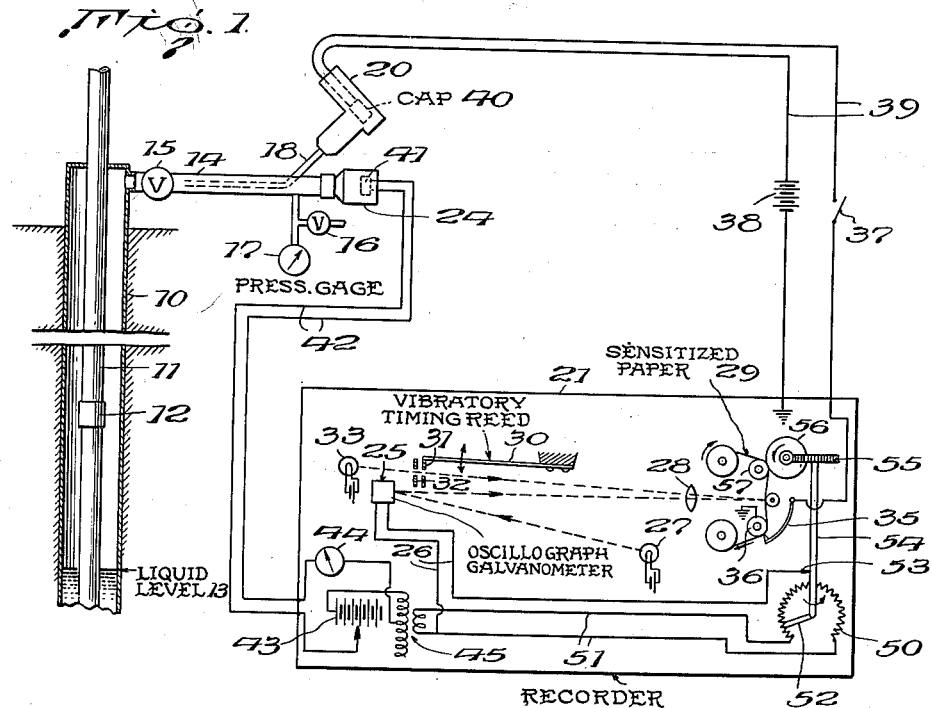

Feb. 18, 1941. O. F. RITZMANN 2,232,476
METHOD OF AND APPARATUS FOR MEASURING DEPTHS IN WELLS
Filed Nov. 27, 1939 3 Sheets-Sheet 1

Inventor
O. F. Ritzmann,
By A. M. Houghton
his Attorney

Feb. 18, 1941.  O. F. RITZMANN  2,232,476
METHOD OF AND APPARATUS FOR MEASURING DEPTHS IN WELLS
Filed Nov. 27, 1939  3 Sheets-Sheet 2
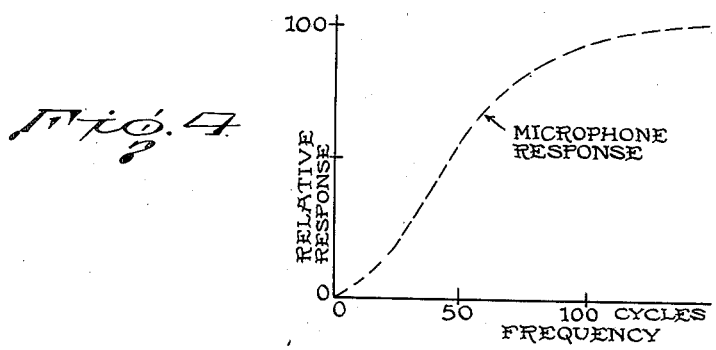
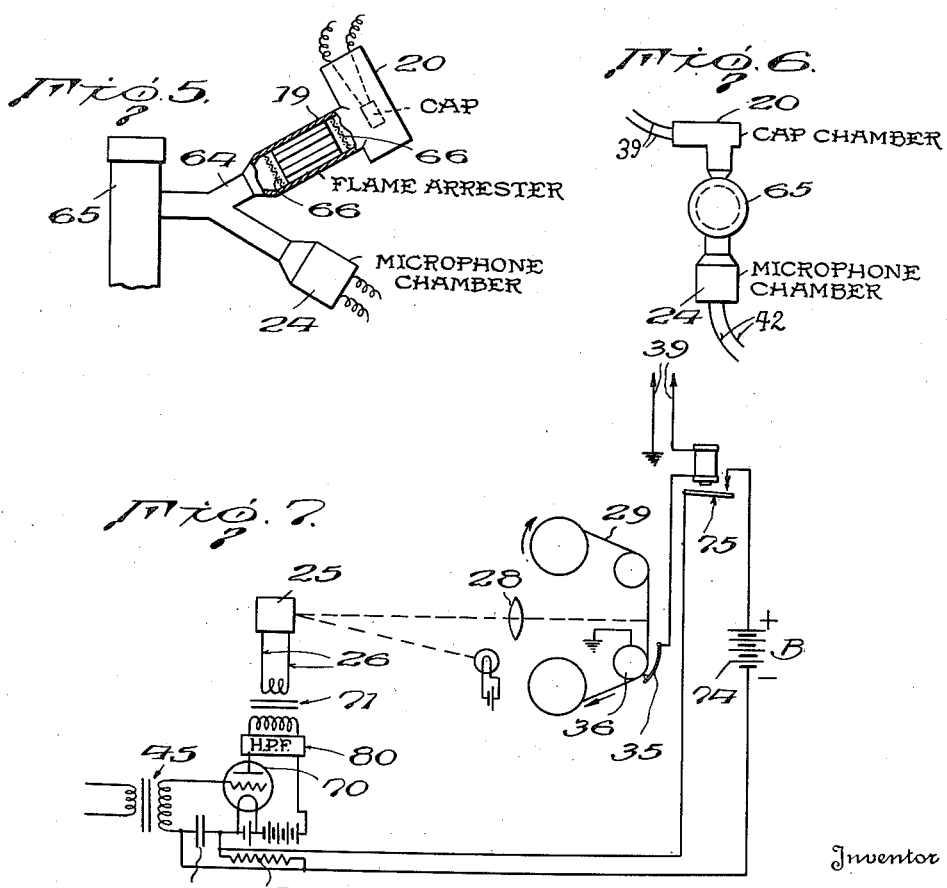
Inventor
O. F. Ritzmann,
By A. M. Houghton
his Attorney Feb. 18, 1941.   O. F. RITZMANN   2,232,476
METHOD OF AND APPARATUS FOR MEASURING DEPTHS IN WELLS
Filed Nov. 27, 1939   3 Sheets-Sheet 3
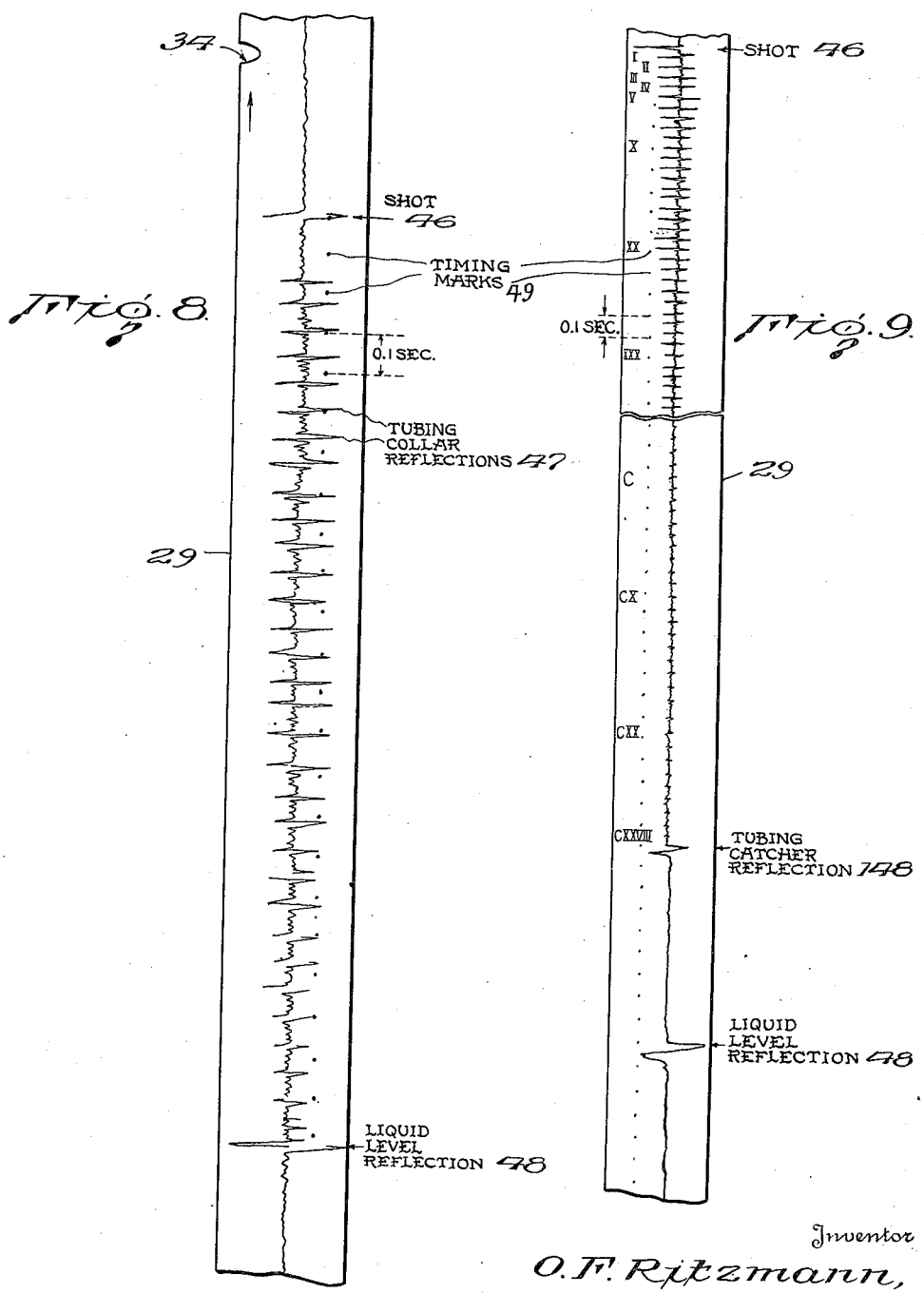

Patented Feb. 18, 1941

2,232,476

UNITED STATES PATENT OFFICE 2,232,476

METHOD OF AND APPARATUS FOR MEASURING DEPTHS IN WELLS

Otto F. Ritzmann, Aspinwall, Pa., assignor to Gulf Research & Development Company, Pittsburgh, Pa., a corporation of Delaware Application November 27, 1939, Serial No. 306,425

4 Claims. (Cl. 181—0.5)

This invention or discovery relates to methods of and apparatus for measuring depths in wells; and it comprises an acoustic apparatus for determining depths in wells, including means for generating a sharp pulse of sound having a substantial portion of its energy in the form of vibrations of frequency above about 40 cycles, and means for receiving and recording sound after reflection from various reflecting surfaces in the well, and characterized by having a greater sensitivity for frequencies above about 40 cycles than for lower frequencies, whereby sharp and definite records are obtained of the reflected sound; and it further comprises a method of sounding wells including the steps of generating a predominantly high frequency sound pulse at the top of a well, and receiving and recording reflected sound vibrations of frequency greater than about 40 cycles; all as more fully hereinafter set forth and as claimed.

In the oil production art it is often desirable or necessary to measure the depth to the liquid level in a well. The liquid is sometimes oil, and sometimes water or mud. The obvious expedient of directly sounding the well with a float, etc., is usually impracticable, especially when the well is on pump. Acoustic methods have been proposed, wherein a sound is generated at the top of the well, and the time observed for the echo of the sound as reflected from the liquid surface. This simple procedure is of limited reliability, because it presupposes a constant, known sound velocity in the space from the top of the well to the liquid level. As a matter of fact the velocity may vary in an undeterminable manner, from the top of the well to the liquid level, through a range of as much as 800 to 1400 feet per second, depending on the character of gases and vapors lying above the liquid level, as well as on temperature at various points in the well. Accordingly it has been proposed to record not only the sound wave echoing from the liquid level, but also the sound reflected from the tubing catcher, tubing collars and other mechanical elements in the well which lie at determinable depths, so that a check is afforded on the measurements. No such system hitherto proposed has enabled consistently reliable depth measurements to be made. In some cases spurious records are obtained in which what seem to be tubing collar reflections are not really correctly attributable to tubing collar reflections. These prior systems have been based on the assumption that the sound generated and received should be of relatively low frequency to avoid excessive attenuation. Low frequency sound waves are attenuated less than high frequency waves. The resulting record often appears as a relatively smooth quasi-sinusoidal undulation, the peaks of which are taken as corresponding to tubing collar reflections. However, sometimes the peaks do not actually correspond to actual tubing collar reflections, and sometimes actual tubing collar reflections do not show up as peaks. These records get more and more difficult to interpret with increasing depth; that is, it is often very hard to pick out more than the first few tubing collar reflections down from the top of the well. Significant echoes are smoothed out.

The present invention is based on the discovery that by employing a high frequency source of sound, which source is furthermore adapted to generate a sharp sound pulse, and by receiving and recording only high frequency reflected sound, remarkably sharp and unambiguous depth records can be obtained, which show up tubing collar reflections clearly and unmistakably. Depth measurements can be made with a high degree of precision, even under difficult circumstances and in pumping wells. By eliminating low frequency waves at the receiver, sharp breaks are obtained in the record for the successive reflections. There is no rounding off or obscuration of the reflection records by low frequency undulations. In routine field operation tubing collar reflections can be accurately detected down to great depths; usually down to the liquid level itself. It is not unusual to pick up the remarkable number of 100 or more successive tubing collar reflections in sounding deep wells according to the invention.

The invention in its apparatus aspect comprises a source of sound including a cap designed to emit a sharp pulse of sound, a substantial proportion of whose energy appears as relatively high frequency vibrations, and a receiving and recording device adapted to record only these higher frequencies and to suppress low frequencies from the record. In its method aspect the invention comprises generating a high frequency sound pulse and receiving and recording the pulses reflected from the liquid level and from intermediate reflecting surfaces, with selection, at the receiver or at the recorder or both, of high frequencies and suppression of low frequencies.

In the accompanying drawings there is shown diagrammatically an example of a specific embodiment of apparatus within the purview of the invention and diagrams illustrative of the carrying out of the method. In the drawings, Fig. 1 is a diagrammatic view of the complete apparatus organization installed at a well, Figs. 2 and 3 are diagrammatic views showing two types of microphones suitable for use in the invention, Fig. 4 is a diagram illustrating the frequency response characteristics of the sound receiver employed in the apparatus of Fig. 1, Figs. 5 and 6 show two modified microphone and cap chamber arrangements, Fig. 7 is a diagram showing a modified response controlling system for the apparatus of Fig. 1, and Figs. 8 and 9 are reproductions of typical depth records obtained according to the invention.

Figures 2, 3:
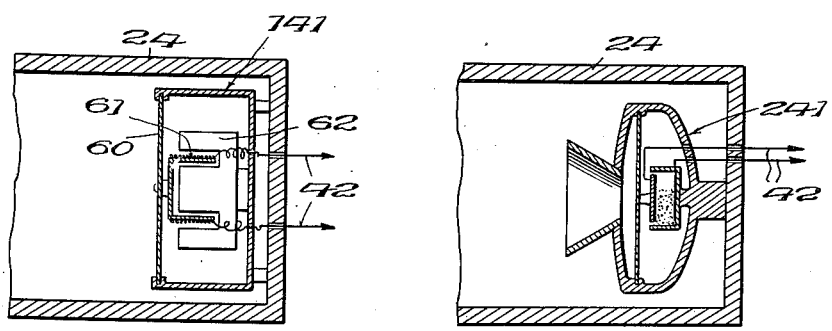

Referring to the drawings, Fig. 1 shows the apparatus applied to a well having the usual casing 10 and tubing string 11, made up of a plurality of joints coupled by tubing collars, one of which is shown at 12. The joints are often about thirty feet long. The liquid level is indicated at 13. The apparatus includes a pipe connection 14, valved at 15, fitted with a pressure release cock 16 and pressure gage 17, and having a branch 18 extending into the pipe connection as shown. A flame arrester 19 (see also Fig. 5) and cap chamber 20 communicate with branch 18. A recorder 21 is provided, shown diagrammatically as including an oscillograph galvanometer 25 adapted on energization through wires 26 to vibrate a beam of light from a lamp 27, focused by a lens 28 on a strip of photographic sensitized paper 29, moved by a suitable motor, not shown. Timing marks are made on the paper with the aid of a reed 30, vibrated at a definite known frequency, conveniently 50 cycles, by a suitable driving means, not shown. The reed carries an apertured shutter 31, cooperating with a fixed apertured shutter 32, to send flashes of light from a lamp 33 to the paper at fixed time intervals; intervals of 0.01 second with a 50 cycle reed. The edge of the paper is notched near its front end at 34 (Fig. 8). On starting up the apparatus, the paper moves and the notch soon registers with a springy contact member 35, which contacts the paper supporting roller 36 and completes a circuit through a switch 37 (closed) a battery 38 and blasting cap leads 39 as is apparent from the drawings.

The apparatus elements so far described are, or can be, of known type, and require no detailed description.

According to the invention, the blasting cap 40 is of a type having a detonating explosive which explodes with great rapidity and a metal shell which ruptures violently, and is adapted to emit a sharp pulse of sound, a substantial proportion of the energy of which is in the form of relatively high frequency vibrations, say 40 cycles or over. One satisfactory cap is disclosed in Burrows Patent 2,153,171. Sometimes a plurality of caps are fired simultaneously to increase the strength of echoes from great depths. There is provided in a microphone chamber 24 a microphone 41, of a type which has a greater frequency response at about 40 cycles than at any lower frequency. While the cap emits a substantial proportion of its energy as high frequency vibrations, the pulse does also contain low frequency vibratory energy, but this is eliminated at the high-frequency-selective microphone or by means of a subsequent electrical filter. Fig. 4 illustrates diagrammatically a useful form of frequency response curve for the microphone, which is closely approached by certain types of microphones. In practical apparatus the frequency response in some cases may not drop substantially to zero below the 40 cycle point, or it may have one or more maxima or minima above this point. The essential condition is as stated that the frequency response should be higher for 40 cycle vibrations than for any lower frequency vibrations.

The microphone is connected to the oscillograph galvanometer through leads 42, a variable tap battery 43, a milliammeter 44, a transformer 45, and an automatic voltage divider, all as shown. The voltage divider takes the form of a resistor 50 connected by leads 51 across the output of transformer 45 and having a rotary brush 52. Leads 26 are connected to a brush 53 engaging the shaft, and to one of leads 51. Brush 52 is driven by a shaft 54 and speed-reduction gears 55 from a friction drum 56 engaging one of the film drums 57, so that when the film is set in motion a gradually increasing fraction of the microphone voltage is applied to the galvanometer and the effective sensitivity of the galvanometer is thus gradually increased. This compensates for the progressive attenuation of echoes coming from lower and lower levels in the well.

Two typical types of microphones useful in the invention are shown, quite diagrammatically, in Figs. 2 and 3. Fig. 2 shows a microphone 141 of the dynamic (floating coil) type, including a diaphragm 60 carrying a light coil 61 in the gap of a permanent magnet 62. Upon receipt of vibrations a current is generated in leads 42 from the coil. Fig. 3 shows a carbon button microphone 241 of type known per se in the telephone art and requiring no description. Both types of microphones have a rising frequency response characteristic of the type indicated in Fig. 4, and give good results in my system. Microphones of the low frequency selective type, such as the hot wire grid type are not suitable for use in the invention. Neither is a microphone or optical-mechanical detector having a low natural frequency, since such devices do not respond to the high frequencies required in this invention.

In operation, valve 15 is opened, switch 37 is closed, and the paper strip is started in motion. When member 35 makes contact through the paper notch, the cap is fired. Echoes are received from the successive tubing collars 12 and finally from the liquid level 13. The echoes are picked up by the microphone and are recorded on the sensitized paper.

Fig. 8 shows a typical record as obtained with the apparatus. The shot instant appears on the record at 46. Successive tubing collar reflections appear at 47, and the liquid level reflection appears at 48. The timing marks in practice usually take the form of transverse lines at intervals of 0.01 second; that is the timing reed vibrates at a frequency of 50 cycles. For the sake of clarity the marks are shown as dots 49, spaced at intervals of 0.1 second. The record reproduced in Fig. 8 was made in a well cased with 7⅝ inch casing and containing a string of 2½ inch upset tubing of average joint length 30.9 feet. The length of each joint, and hence the average joint length, is readily obtainable from the records ordinarily kept for wells. From the record it is seen that the total time between the shot instant 46 and the liquid level reflection 48 is 2.322 seconds. The time for 30 tubing lengths is 2.050 seconds. Thus the distance to the liquid level is (2.322/2.050) × 30 × 30.9 or 1050 feet. In this particular record reflections from all the tubing collars are visible. In such a case it is also possible to merely count tubing collar reflections and multiply by the average tubing length or add the known individual tube lengths to get total depth. In some cases reflections from the lowermost few tubing collars may be somewhat obscured, but it is sufficiently accurate to compute the liquid level depth on the basis of the reflections from those tubing collars which give clear reflection records.

With usual tubing lengths which are about 30 feet and a sound velocity of about 1000 feet per second as in this example, the number of tubing collar reflections per second received at the microphone is about (1000/30) × ½ or 17. In my system the vibrations received and recorded are of frequency at least 40 cycles, and may be more; several times the frequency of tubing collar echoes. The record as shown resolves each tubing collar echo; in fact it reveals a number of extraneous vibrations between the collar reflections, which are disregarded.

Records made in wells on pump are similar to the record of Fig. 8 and are equally clear.

Fig. 9 is taken from another typical record, in which about 128 tubing collar reflections are apparent. The Roman numerals refer to these reflections. The total time is 8.95 seconds. The depth to the tubing catcher (the trace of the echo from the tubing catcher appears at 148), calculated from the reflection time, the number of tubing collar reflections and the average length of the tubing joints, is 3982 feet, and of the liquid level 4433 feet. In this particular case the tubing collar reflections from below the level of the tubing catcher, or thereabouts, become indistinct; but the depth to the liquid level can still be accurately determined, by virtue of the large number of reflections which enable an accurate check on the velocity of sound through most of the well. Distinct reflection traces are obtained from surprisingly great depths due to the high frequency characteristics of the source and the receiving apparatus.

Fig. 5 shows an optional arrangement of the cap chamber 20 and microphone chamber 24, these being disposed on the two branches of a Y-fitting 64 attached to the casing head 65 as shown. The flame arrester 19 (cf. also Fig. 1) takes the form of a pair of screens 66 and a bundle of small tubes 67, and works on the principle of the Davy safety lamp. It is of conventional construction. If desired the cap chamber and microphone chamber can simply be attached to opposite sides of the casinghead; Fig. 6.

Fig. 7 shows an optional response controlling device, to take the place of the voltage divider of Fig. 1. It includes a vacuum tube 70 the grid circuit of which is connected to the secondary of transformer 45 and the plate circuit of which delivers, through a transformer 71, to the oscillograph leads 26. A condenser 72 is interposed in the grid circuit, shunted by a resistor 73 in circuit with a battery 74 and a normally open relay switch 75, energizable by current in leads 39. Upon closing switch 37 (Fig. 1) switch 75 closes and voltage is momentarily applied to the tube from battery 74, biasing the tube, and cutting off the supply of signal current to the oscillograph. The charge on the condenser 72 gradually leaks off (in the course of a few seconds) through resistor 73, thus gradually restoring the effective sensitivity of the oscillograph galvanometer. The bias can be made sufficient to keep the direct pulse and the early reflections from causing excessive deflections. The rate of dissipation of the condenser charge can be adjusted, by means of resistor 73, to restore the sensitivity at a suitable rate such that the later reflections will be comparable to the early ones.

The automatic response controls shown in Figs. 1 and 7 can be omitted, if desired.

If desired the receiving apparatus can be made to have a sharper effective low frequency cutoff by providing a high pass filter in circuit. Fig. 7 illustrates this feature; a high pass filter being inserted at 80 in the output from tube 70. The filter can of course also be employed in the apparatus of Fig. 1 if desired.

While the invention has been described primarily in reference to determining liquid levels, it is also useful for determining other depths in a well, for example the depth of the bottom or the depth to the tubing catcher, etc.

What I claim is:

1. A method of determining depths in well bores containing liquid partially filling the bore and containing tubing coupled at spaced intervals and extending down to the liquid, comprising the steps of sending down the space between the tubing and the bore a high frequency explosive sound pulse, a substantial proportion of whose energy is in the form of high frequency vibrations of frequency higher than 40 cycles, and receiving at a point in sound receiving relationship to the top of the well, high frequency sound vibrations of frequency at least 40 cycles and being several times the frequency of echoes received from the spaced tubing couplings, and recording said high frequency vibrations, whereby tubing coupling reflections are individually discernible in the sound vibration record.

2. The method of claim 2 wherein the first of said vibrations are received and recorded at relatively low sensitivity, and later vibrations are recorded at progressively higher sensitivity, to compensate for falling off in amplitude of reflections coming from deeper parts of the well.

3. An apparatus for determining depths in wells partially filled with liquid and cased in at least the uppermost portion and containing coupled tubing, comprising high frequency sound pulse generating means in communication with the annular space between the casing and tubing and adapted on actuation to generate a sound pulse, a substantial proportion of whose energy is in the form of vibrations of frequency above 40 cycles, and a receiver comprising an electrical-signal-producing sound detector in sound-receiving relationship with said annular space and signal recording means electrically connected to the detector, said receiver characterized by having relatively low sensitivity to frequencies of the same value as the number of tubing coupling reflections per second, and relatively great sensitivity only to frequencies above 40 cycles and being substantially greater than such number of tubing coupling reflections per second; whereby individual tubing coupling reflections appear as sharp high amplitude vibrations with intervening portions of relatively low amplitude.

4. An apparatus for determining depths in wells partially filled with liquid and cased in at least the uppermost portion and containing coupled tubing, comprising high frequency sound pulse generating means in communication with the annular space between the casing and tubing and adapted on actuation to generate a sound pulse, a substantial portion of whose energy is in the form of vibrations of frequency above 40 cycles, a microphone in sound-receiving relation to said annular space and characterized by having a relatively low sensitivity to frequencies of the same value as the number of tubing coupling reflections per second and a relatively high sensitivity only to frequencies above 40 cycles and being substantially greater than the number of tubing collar vibrations per second, an amplifier and a recorder connected to the microphone, and means for progressively increasing the effective amplification during receipt of reflections from deeper tubing couplings; whereby individual tubing coupling reflections appear as sharp high amplitude peaks with intervening low amplitude portions.

OTTO F. RITZMANN.

CERTIFICATE OF CORRECTION.

Patent No. 2,232,476. February 18, 1941.

OTTO F. RITZMANN.

It is hereby certified that error appears in the printed specification of the above numbered patent requiring correction as follows: Page 2, second column, line 72, for "2,322" read --2.322--; page 3, second column, line 38, for the claim reference numeral "2" read --1--; and that the said Letters Patent should be read with this correction therein that the same may conform to the record of the case in the Patent Office.

Signed and sealed this 25th day of March, A. D. 1941.

Henry Van Arsdale,
Acting Commissioner of Patents.

(Seal)

CERTIFICATE OF CORRECTION.

Patent No. 2,232,476.   February 18, 1941.

OTTO F. RITZMANN.

It is hereby certified that error appears in the printed specification of the above numbered patent requiring correction as follows: Page 2, second column, line 72, for "2,322" read --2.322--; page 3, second column, line 38, for the claim reference numeral "2" read --1--; and that the said Letters Patent should be read with this correction therein that the same may conform to the record of the case in the Patent Office.

Signed and sealed this 25th day of March, A. D. 1941.

(Seal)

Henry Van Arsdale,
Acting Commissioner of Patents.